May 16, 1961  E. A. MATECKI  2,983,949
APPARATUS FOR SHIRRING SAUSAGE CASINGS
Filed July 22, 1959  9 Sheets-Sheet 1

INVENTOR.
EDWARD A. MATECKI
BY Harry H. Levin
ATTORNEY

INVENTOR.
EDWARD A. MATECKI

May 16, 1961  E. A. MATECKI  2,983,949
APPARATUS FOR SHIRRING SAUSAGE CASINGS
Filed July 22, 1959  9 Sheets-Sheet 3

INVENTOR.
EDWARD A. MATECKI
BY
ATTORNEY

May 16, 1961   E. A. MATECKI   2,983,949
APPARATUS FOR SHIRRING SAUSAGE CASINGS
Filed July 22, 1959   9 Sheets-Sheet 4

INVENTOR
EDWARD A. MATECKI
BY
ATTORNEY

May 16, 1961  E. A. MATECKI  2,983,949
APPARATUS FOR SHIRRING SAUSAGE CASINGS
Filed July 22, 1959  9 Sheets-Sheet 6

INVENTOR.
EDWARD A. MATECKI
BY
ATTORNEY

May 16, 1961 E. A. MATECKI 2,983,949
APPARATUS FOR SHIRRING SAUSAGE CASINGS
Filed July 22, 1959 9 Sheets-Sheet 7

INVENTOR.
EDWARD A. MATECKI
BY
ATTORNEY

Fig. 21.

INVENTOR.
EDWARD A. MATECKI
ATTORNEY

May 16, 1961 E. A. MATECKI 2,983,949
APPARATUS FOR SHIRRING SAUSAGE CASINGS
Filed July 22, 1959 9 Sheets-Sheet 9

INVENTOR.
EDWARD A. MATECKI
BY
ATTORNEY

United States Patent Office 2,983,949
Patented May 16, 1961

2,983,949
APPARATUS FOR SHIRRING SAUSAGE CASINGS

Edward A. Matecki, Evergreen Park, Ill., assignor to Union Carbide Corporation, a corporation of New York Filed July 22, 1959, Ser. No. 828,761

15 Claims. (Cl. 17—42)

This application is a continuation-in-part of application Serial No. 768,166, Edward A. Matecki, filed October 20, 1958, entitled "Manufacture of Shirred Sausage Casings."

This invention relates to the art of shirring sausage casings and more particularly to sausage casings of regenerated cellulose.

Cellulose (regenerated) casings are used extensively in the manufacture of skinless frankfurters and wieners. In practice, a cellulosic tube of an appropriate length, such as 32′, 40′, 55′, or more, is shirred and then compressed to produce (what is commonly termed in the art) a stick of from about 6″ to 10″ in length, and such stick is positioned on a horn of a stuffing apparatus and thereafter stuffed. The stuffed tube is then linked and processed as is well known in the art to produce skinless frankfurters.

In the commercial manufacture of frankfurters and other sausage products, the meat packer for reasons of economy and to speed up the stuffing operation, demands a shirred sausage casing in the form of a stick highly compressed in length, and with a large internal hole. Such form is desirable to permit easy and speedy placing of the casing onto a meat stuffng horn, the large hole of the shirred casing permitting the use of larger diameter stuffing horns and thus enabling more rapid filling of the casing.

Sausage stuffing horns are commonly made of thin-walled metal tubing, which are affixed and connected to pressurized containers of meat emulsion. Flow of the meat emulsion from the pressurized container to the stuffing horn is controlled by a stop cock. Greater speed in the stuffing operation demands more rapid and uniform filling of each stick of casing successively applied to the stuffing horn. While some improvement in throughput of meat emulsion through stuffing horns can be accomplished by increasing the pressure on the meat emulsion, such measure is limited as excessive pressures may cause adverse changes in the basic structure of the meat emulsion.

A technical study was made of stuffing variables such as horn length and diameter, meat emulsion viscosity, pressure, and casing characteristics on the stuffing throughput for commonly used sausage emulsions. A summary of the basic data experimentally determined was resolved into a formula for frankfurter emulsions stuffing throughput which is:

$$W = K \times \frac{D^{4+} \times P^{3+}}{L^{2-} \times V^{3+}}$$

where $W$ = throughput of emulsion in grams/second
$K$ = dimensional constant
$D$ = horn inside diameter, in inches
$P$ = stuffing pressure, in pounds/square inch
$L$ = horn length, in inches
$V$ = emulsion viscosity, in centipoises Accordingly, the throughput of meat emulsions commonly used in stuffing frankfurters may be varied directly as approximately the fourth power of the filling tube internal diameter; and inversely as approximately the square of the horn length and the cube of the viscosity. Thus a shirred casing with a larger hole size permits the use of a larger diameter stuffing horn, thereby permitting greater meat throughput and shortening the time of the filling cycle. Such an improvement is of considerable commercial importance to meat packers.

An object of this invention is to provide shirred and compressed cellulosic sausage casings of maximum hole diameter for a specific length, for more rapid stuffing therein of sausage meat emulsion.

Another object of this invention is to provide shirred and compressed cellulosic sausage casing of a shorter length for a specific hole diameter.

An additional object of this invention is to provide shirred and compressed cellulosic sausage casing wherein the pleated or wrinkled casing wall is efficiently distributed circumaxially with respect to the internal hole.

A further object of this invention is to provide shirred and compressed cellulosic sausage casing characterized by uniform filling and by smooth deshirring from the exit end of sausage stuffing horns.

Another object of this invention is to provide an improved method of collapsing cellulosic tubing in a helical pattern to yield a shirred casing of maximum hole size from a tubing of a given diameter.

Still another object of this invention is to provide a method of shirring cellulosic casing yielding more uniform displacement of the casing around the mandrel upon which the casing is shirred.

A further object of this invention is to provide novel shirring apparatus for helically shirring cellulosic casing.

Another object of this invention is to provide shirring apparatus capable of rapidly shirring cellulosic casing with minimum damage thereto.

Another object of this invention is to provide shirring apparatus which is readily adjustable to shirr casings of different diameters.

Another object of the invention is to provide, in apparatus for shirring cellulosic casing, improved means for transporting the casing to be shirred through the shirring mechanism.

Still another object of the invention is to provide, in apparatus for shirring cellulosic casing, improved casing gripping means in connection with the shirring mechanism.

Still another object of the invention is to provide, in apparatus for shirring cellulosic casing, improved means for preventing, during operation, flare-ups of the unshirred casing adjacent the entrance to the shirring mechanism.

Other and further objects will become apparent hereinafter.

According to this invention there is provided an elongate shirred and compressed stick of regenerated cellulose tubing substantially circular in cross section having an internal hole of predetermined size and a substantially cylindrical exterior surface, said tubing having its wall longitudinally collapsed into an ordered repeated shirred pattern of at least three discrete, successive, longitudinally collapsed sections of casing, the collapsed sections in said pattern being successively angularly disposed with respect to each other in overlapping helical relationship about the axis of the hole. Preferably the collapsed sections are successively equiangularly displaced about the axis of the hole to obtain a shirred stick having a maximum hole diameter for a specific length thereof.

The shirring of cellulosic casing according to this invention is accomplished by inflating cellulosic casing to a self-supporting tubular shape, continuously moving the inflated casing concentrically over a mandrel of smaller diameter than the inflated casing to and through an eccentrically gyrating passage of smaller cross-sectional area than the inflated casing but larger than the mandrel, said passage being formed by a plurality of identical, synchronously rotating rolls each having a peripheral surface of spaced, saddle shaped cogs and with said rolls being equidistantly spaced from the mandrel axis, the saddles of the respective rolls sequentially mating together at said passage to circumferentially grip and indent successive discrete sections of the casing and orbitally displacing said casing sections from their concentric relationship with the mandrel, and continuously gathering the displaced sections of casing into a uniform helically pleated shirred tube by retarding the forward movement of casing leaving the gyrating passage; the shirring operation is continued until a tube of predetermined length has been shirred. The shirred tube is then compressed, forcing the pleats into close mutually supporting relation, thus forming a self-sustaining stick of casing.

The coaction of several rotating shirring rolls to form a gyrating passage is dependent upon a cogged peripheral surface thereon in the form of uniformly spaced individual saddle shaped projections of arcuate cross-section. The arcuate cross-section of each saddle is of such height and configuration to cause a supporting engagement and indentation of a portion of the casing periphery coming into contact therewith but without forcing the casing wall into contact with the mandrel surface. By simultaneously bringing together an opposing suitably shaped cog of each shirring roll into abutting relationship there is thereby formed a passage for the casing. The passage depending upon the height and lateral displacement of each saddle with respect to the center line of its roll is formed essentially by a plurality of arcs of circles and should be eccentric with the mandrel. With suitable positioning of successive cogs of various heights and lateral displacement around each roll as will be hereafter shown, there can be provided a sequential gyrating eccentric passage whereby the moving casing is progressively helically displaced with respect to the mandrel surface.

At least three identical cogged shirring rolls are employed in order to obtain a shirred casing of substantially circular cross section. Shirring apparatus having more than three shirring rolls further improves the roundness of the shirred casing and similarly yielding a larger hole or a shorter stick, or both.

The shirring action of the cogged surfaced rolls begins with the initial contact of the casing periphery by the leading edge of a saddle in each roll. As each of said cogs approaches a perpendicular position with respect to the mandrel axis, the section of casing immediately ahead of the cogs' leading edges bulges outwardly from the mandrel and into recessed spaces between the cogs. Depending on the eccentricity of the passage formed by directly opposing cogs with respect to the mandrel, the bulged section of the casing can be of oval, or like arcuate shape, and substantially a similar cross-sectional pattern is retained upon the collapsing of the section. In the contacting of the casing by the cogs and the formation of the bulge, creasing and wrinkling are initiated in the surface of the casing affected. With further rotation of the rolls, the bulge of casing is progressively collapsed since the bulge is confined within the recessed spaces and is ultimately collapsed and confined on the mandrel into a cone-like formation against the already shirred casing by the shirring cogs, since there is a retarding force applied to the casing after passage through the rolls. In the collapsing of the bulges a matrix of small wrinkles or folds is formed in the casing wall.

The oval-shaped configuration provides for maximum circumaxial displacement of the casing and hence a compressed shirred stick of greater hole size and shorter length, since oval-shaped sections are consecutively placed in helically staggered overlapping relationship along the length of the casing by the action of the gyrating passage.

Lubrication of the shirring saddles of the rolls and the interior of the cellulosic casing with a suitable lubricant is essential to facilitate pleating of the casing and to avoid abrasion damage thereto.

Retarding of the forward movement of the shirred casing can be provided by means effective to engage the shirred tube after passage through the shirring rolls and to advance the shirred tube away therefrom at a metered rate considerably less than that of the shirring rolls.

Under certain operating conditions it has been found that flare-ups occur, that is, the feed rolls transport inflated casing to the shirring rolls but the shirring rolls evidently slip on the casing and do not move it through the rolls, thereby permitting the inflated casing to pile up in front of the shirring rolls. Such flare-ups occur while standard operating conditions of the machine itself, of the unshirred casing stock and of the operating environment are in effect insofar as can definitely be determined. While some theories have been suggested as an explanation of this phenomena, these relating to possible differences in unshirred casing stock, differences in surface conditions of the shirring rolls or differences in the atmosphere, for example, the relative humidity in the shirring area, the soundness of such theories is not known. The fact apparently is that the gripping of the rolls on the casing becomes insufficient and shirring fails.

It has been found that the condition indicated can be corrected in apparatus according to the invention utilizing triad groups of cogs on each roll by making an appropriate cog of each triad group of cogs of increased length circumferentially relative to the other cogs of that group. In this fashion a gripping or binding effect is obtained between the trailing edge of the elongated cog of one group and the leading edges of the normal length cogs of the immediately succeeding group.

The nature of the invention and the manner in which it can be practiced will be further understood from the following detailed description taken in connection with the accompanying drawings illustrating several embodiments of the invention and wherein—

Figure 1:
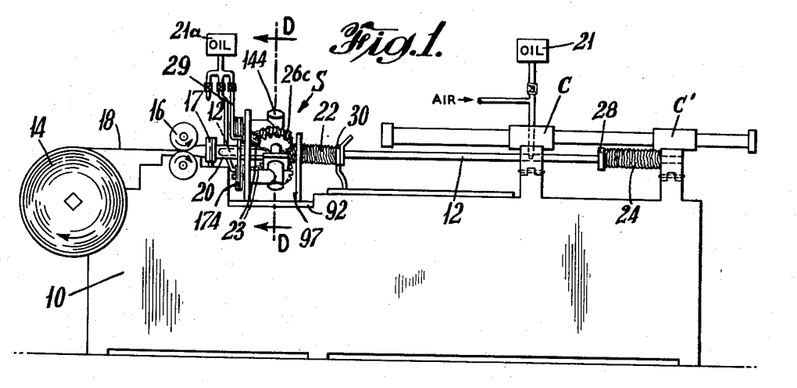
Figure 1 is a side elevational view (diagrammatic) of a shirring apparatus, being one embodiment of the present invention.

Referring now to the drawing wherein several embodiments of the invention are shown and like reference numerals and characters designate like parts, in Fig. 1 the reference numeral 10 designates a power driven shirring machine wherein a supply of flattened tubing such as cellulosic tubing 18 is intermittently withdrawn from a supply reel 14 in measured lengths, such as 40', 44', 55', by a pair of horizontally mounted metering rolls 16 and is guided into a "zone of shirring" S by vertically mounted guide rolls 17. The flattened tubing 18 is advanced through metering rolls 16, expanded to inflated tubing 20 as by gaseous means and guided onto and by a hollow mandrel 12 to a "zone of shirring" S. The mandrel supplies the gaseous means through an internal hole 40 shown in Fig. 2 and is releasably held in position by clamps C and C'.

The gaseous means which, for example, may be air under a pressure of about six pounds per square inch gauge is supplied from any convenient source to the bore of mandrel 12, as by an internal passage through clamp C communicating with the bore of the mandrel through a radial opening in the mandrel wall. Metered quantities of oil are supplied to the air stream from an oil reservoir 21 whereby the oil is carried by the air through the bore 40 and is discharged at the end of the mandrel adjacent guide rolls 17 to lubricate the exterior surface of the mandrel and the interior surface of the casing 20.

As shown in Fig. 1, the basilar surfaces of the cogs are lubricated by brushes 23 to which a suitable lubricant is fed from an oil supply reservoir 21a.

The desired length of inflated casing is loosely shirred in shirring zone S against a cooperatively yielding holdback member 30 and the shirred casing 22 then is cut off from a subsequent length of shirred casing at a point adjacent to vertical member 97, the cut length is moved through opened clamp C and compressed to lengths such as 7" to 12" by compressing member 28, resulting in a compressed, shirred casing 24. The shirred compressed stick of casing 24 is doffed from the mandrel 12 through open clamp C' for packaging.

Figure 2:
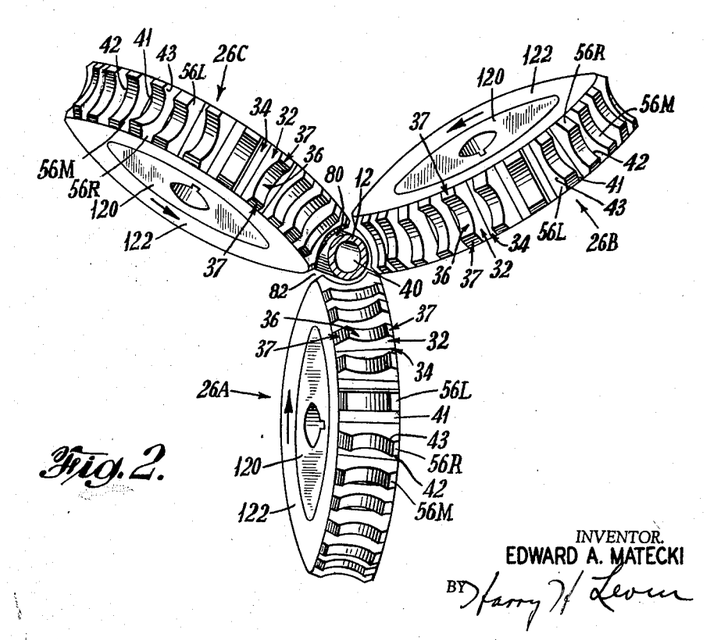
Fig. 2 is a perspective view of a shirring apparatus having three identical cogged shirring rolls as positioned in the shirring zone with the mandrel being shown in section at the central passage formed by opposing cogs of the rolls.

Referring now to Fig. 2, the shirring means in a preferred embodiment is comprised of three identical keyed cogged shirring rolls 26A, 26B, 26C rotatably mounted and disposed equiangularly (120°) around the shirring mandrel 12 and spaced equidistantly from the axis of mandrel 12 to form passage 80 around the mandrel 12. Each of the rolls 26A, 26B, 26C is independently adjustable (as shown in greater detail in Figs. 13 and 14) relative to each other and to the passage 80 provided therebetween through which the mandrel 12 extends and the tubular casing to be shirred passes.

Each of rolls 26A, 26B, 26C consists of a metallic core 120 provided with a covering 122 of a suitable oil-resistant material such as rubber, plastic, and the like.

One suitable form of roll material is a synthetic rubber composition sold by Ideal Roller Company under the designation XN1428 and being of 75°–85° durometer hardness and with a surface finish of about 8 to 12 micro-inch (A.S.A. Standard B. 46.1—1947).

With continued reference to Fig. 2 it will be observed that the covering 122 has been machined or otherwise shaped into a plurality of saddle shaped cogs 32 with spaces 34 therebetween, extending inwardly to root periphery 41. Each of the cogs 32 has an arcuate basilar surface 36 located between beveled edges 37 which are of such angularity, for example 60°, to provide an operating clearance 82 such as from 0.002" to 0.015" between adjacent rolls. The radius of concavity of arcuate basilar surface 36 is at least equal to half the greatest cross-sectional dimension of the passage 80. The peripheral casing-contacting basilar surfaces 36 are formed in three shapes, and successively positioned as a plurality of recurring triads of cogs.

Figures 3, 4, 5, 6:
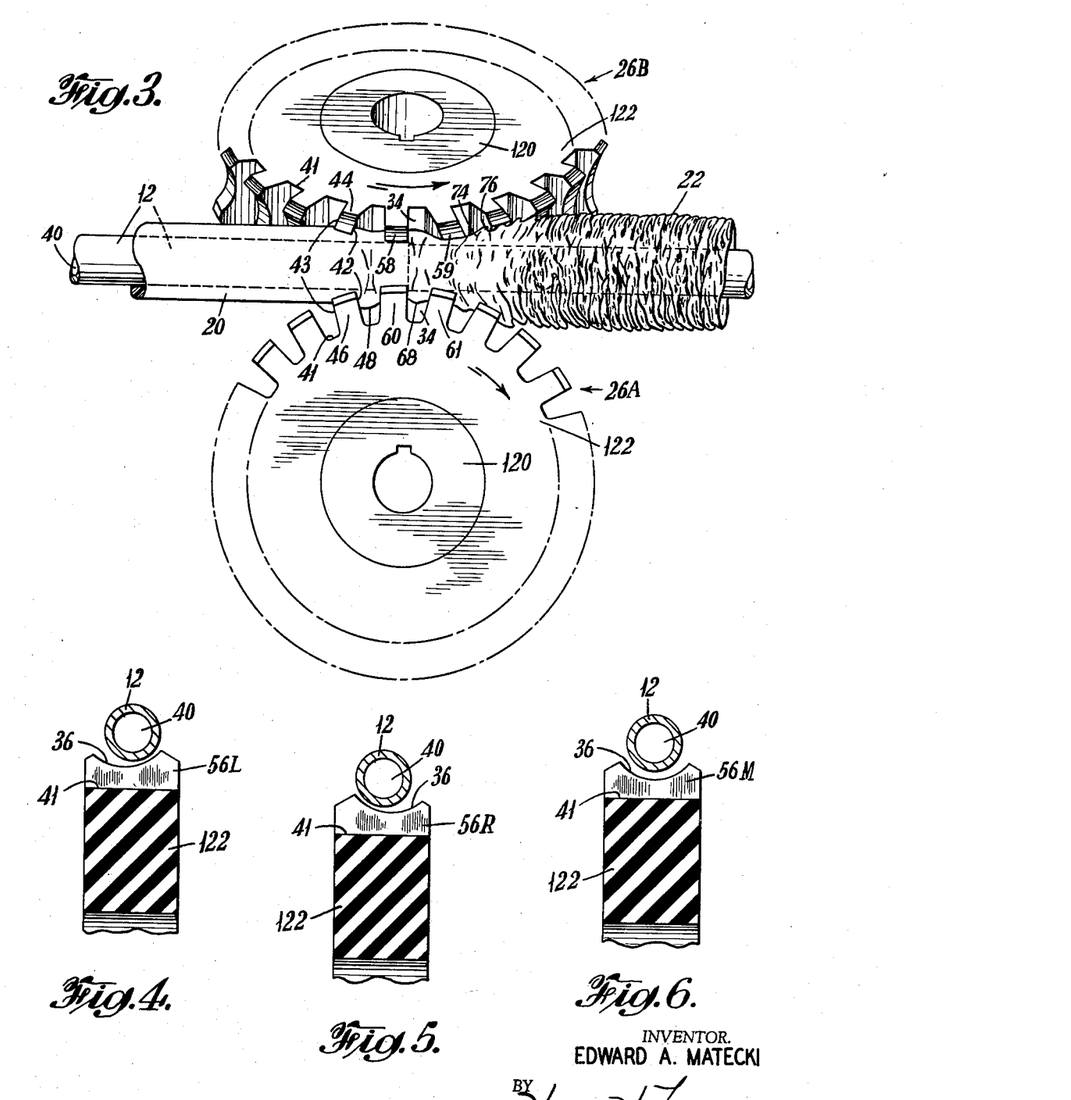
Fig. 3 is a side elevational view partly in section, with one of the shirring rolls not shown in order to illustrate the cooperative action of the cogged shirring rolls in indenting, gripping, and folding the casing into a pleated or wrinkled structure as diagrammatically shown.
Fig. 4 is a sectional view of a portion of the shirring rolls of Figs. 2 and 3 and showing the profile of a left-inclined cog.
Fig. 5 is a sectional view of another portion of the shirring rolls of Figs. 2 and 3 and showing the profile of a right-inclined cog.
Fig. 6 is a sectional view of still another portion of the shirring rolls of Figs. 2 and 3 and showing the profile of a medial cog.

In Fig. 3 wherein one of the shirring rolls 26C is not shown in order to illustrate more clearly the shirring action of the three rolls, it will be seen that the leading edges 42 of opposing cogs 44 and 46 of rolls 26B and 26A, respectively, initially circumferentially indent the inflated casing 20, causing the casing 20 to be ballooned outwardly to form a slightly wrinkled or creased bulge 48. It will be observed that in the space 34 between cogs 58 and 59 of roll 26B and the space 34 between cogs 60 and 61 of roll 26A a bulge 68 similarly previously formed in the casing has been carried forward past the center line of the rolls 26B and 26A, and cog 59 of roll 26B and cog 61 of roll 26A are collapsing and further wrinkling and creasing bulge 74 against already collapsed casing. It is to be understood that roll 26C not shown in Fig. 3 similarly coacts with the inflated casing 20.

Fig. 4 illustrates a left-inclined cog surface 56L made by locating the center of arcuate surface 36 to the left of the mandrel 12 vertical centerline.

Fig. 5 illustrates a right-inclined cog surface 56R made by locating the center of arcuate surface 36 to the right of the mandrel 12 vertical centerline.

Fig. 6 illustrates a medial cog surface 56M made by locating the center of arcuate surface 36 on the mandrel 12 vertical centerline.

Referring again to Fig. 2, each of rolls 26A, 26B, and 26C consists of a repeating plurality of triads of concave cog surfaces 56R, 56L, and 56M, each cog being saddle shaped. Each of the cogs has a leading edge surface 42 and trailing edge surface 43, and intermediate the respective leading and trailing edge surfaces, a basilar surface 36.

Figure 7:
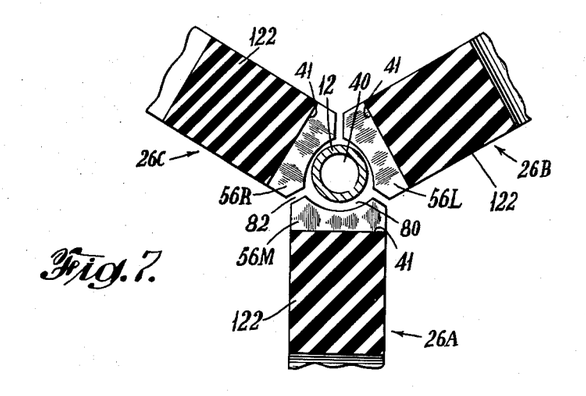
Fig. 7 is an enlarged sectional view taken generally along line D—D of Fig. 1, showing three opposing shirring cogs forming a central passage eccentrically disposed with respect to the shirring mandrel.

Referring to Fig. 7, the shirring rolls 26A, 26B, 26C are positioned to form the eccentric passage 80 of a size less than the diameter of the inflated tube 20 (not shown) passing therethrough, whereby each cog will indent the tube without causing it to contact the mandrel 12 and feed the tube forward. The first position of the rolls at the start of a triad shirring cycle shows roll 26A positioned with its cog 56M, roll 26B positioned with its cog 56L, and roll 26C positioned with its cog 56R, all of said cogs being directly opposed and mating over mandrel 12 to form passage 80 and with working clearances 82 intermediate their beveled edges, thereby orbitally displacing inflated casing 20 (not shown) downwardly toward the mandrel 12 and roll 26A.

Figure 8:
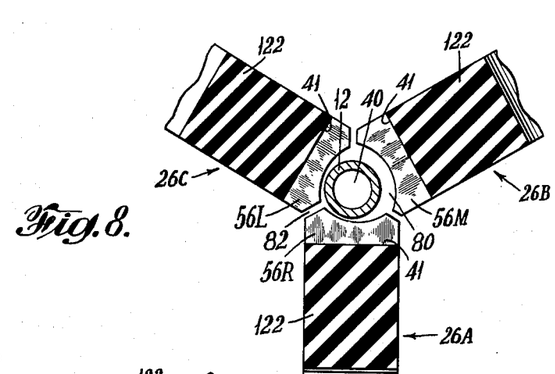
Fig. 8 is a sectional view similar to Fig. 7 showing a second set of three shirring cogs also forming a central passage eccentrically disposed in another position.

Fig. 8, representing the rolls at the second part of the triad shirring cycle, shows roll 26A positioned with cog 56R, roll 26B positioned with cog 56M, roll 26C positioned with cog 56L mating to form passage 80 and with spaces 82 intermediate their beveled edges, thereby orbitally displacing the casing 20 (not shown) inwardly toward the mandrel 12 and roll 26B.

Figure 9:
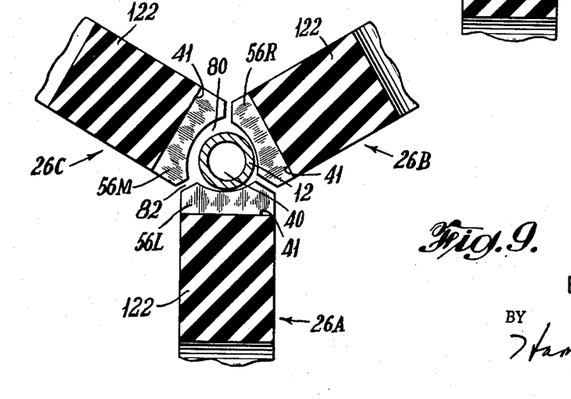
Fig. 9 is a sectional view similar to Fig. 7, showing a third set of shirring cogs forming a central passage of still different eccentricity to the mandrel.

Fig. 9, representing the rolls at the third part of the shirring cycle, shows roll 26A positioned with cog 56L, roll 26B positioned with cog 56R, roll 26C positioned with cog 56M mating to form passage 80 and with space 82 intermediate their beveled edges, thereby orbitally displacing casing 20 (not shown) inwardly toward the mandrel 12 and roll 26C.

Thus, as the three rolls 26A, 26B, and 26C are rotated by appropriate driving means, the eccentric passage 80 is repeatedly gyrated about the center of mandrel 12, successively through configurations of Figs. 7, 8, and 9 and thereby similarly successively displacing discrete sections of inflated casing 20 from a concentric position with respect to the mandrel 12.

Figures 10, 11, 12:
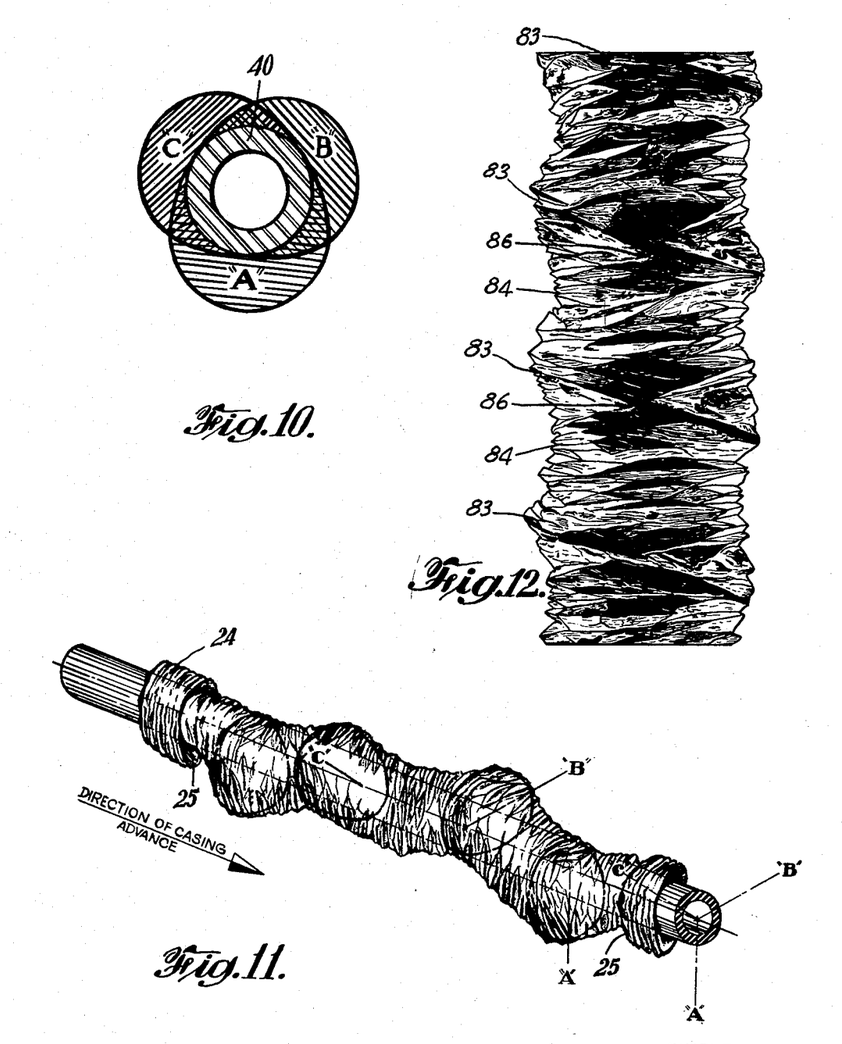
Fig. 10 is a slightly enlarged section taken generally along line D—D of Fig. 1 showing three superimposed casing sections as successively eccentrically displaced from the mandrel by successive groups of opposing cogs.
Fig. 11 is a slightly enlarged perspective view substantially representing a shirred and compressed casing produced by the shirring rolls shown in Figs. 2 to 9, part of which has been deshirred to illustrate the helical positioning along the casing of the displaced casing sections shown in Fig. 10.
Fig. 12 is a slightly enlarged representation of the lower half of the deshirred portion of the shirred casing shown in Fig. 11.

Referring now to Fig. 10 which is drawn as an enlarged section along line D—D of Fig. 1, the several shaded sections together forming a trefoil pattern depict the perimeters of and the overlapping of successive ovate sections "A," "B," "C" in the casing as respectively imparted thereto in moving through the gyrating passage 80 of Figs. 7, 8, and 9. The trefoil distribution of discrete casing sections producing a stick having a substantially cylindrical outer surface is a highly desirable improvement, because the ovate sections are circumaxially distributed over a substantially greater area such as 12 percent greater than prior structures and thereby disposing a lesser number of tubing wall sections axially adjacent each other. Thus, with the new method, an equal length of tubing of given wall thickness may be shirred and compressed to a shorter length or larger hole, or both.

Fig. 11 is an enlarged diagrammatic perspective of casing shirred and compressed on the apparatus shown in Figs. 1–9 and then deshirred in place on mandrel 12. It will be noted that the substantially helical arrangement of discrete casing sections made by advancing the tubing to and through the gyrating passage 80, essentially comprises a series of helically positioned ovate sections "A," "B," "C" together with a portion of the casing wall material on each side thereof, said ovate sections corresponding to those shown in Fig. 10. The folds of the shirred and collapsed casing 24 overlie each other due to the wiping action of the cogs in collapsing the casing wall against already collapsed casing, the overlying being shown by the conical formations 25.

Fig. 12 is a representation of the lower half of the deshirred portion of the shirred casing shown in Fig. 11. It will be observed that there are four transverse diagonal ridge-like portions 83 which are indicative of the substantially helical shirred pattern consisting of collapsed overlapping ovate sections of casing. Centrally of these ridge-like portions are V-shaped intersecting wrinkles or creases 84, the apexes 86 of which correspond in position to the midpoints of the base or bulbous portions of ovate sections "A" shown in Fig. 11 and thus correspond in position to the sections of casing wall material collapsed by successive medial cogs in roll 26A.

Apexes formed by the medial cogs of rolls 26B and 26C are not shown in Fig. 12 but are present in the shirred casing wall spaced approximately 120° around the casing from the apexes shown and correspond in position to the base or bulbous portions of ovate sections or displacements "B" and "C" as shown in Fig. 11.

One actual form of apparatus according to the invention was constructed and operated by means of a three-roll apparatus as illustrated in Figs. 1–9 and 13–14A, to shirr casing of 29/32" inflated diameter at the rate of 420 ft. per minute of casing length, said casing being inflated with air at a pressure of six to seven pounds per square inch gauge and being lubricated with a suitable oil. Suitable lubricants include water-white U.S. Pharmacopoeia white mineral oil of Saybolt viscosity from 76° to 80° cotton seed oil, soya oil, and glycerine. Lubricant in minimal amount to keep the mandrel and saddle surfaces coated was ordinarily from about 0.0002 gram to 0.0013 gram per 6-inch length (frankfurter length) of casing being shirred.

In repeated operations 55 ft. lengths of casing stock were shirred on a mandrel of 0.62 inch diameter slightly reduced in diameter following the shirring zone to facilitate the movement of casing therealong, to a compressed length of about 8¾ inches, the movement of the shirred casing along the mandrel being retarded by a holdback mechanism 30 to a rate of one inch for each two feet of unshirred casing.

The specifications of the rolls 26A, B, C, in such constructed apparatus being as follows:

| | |
|---|---|
| Roll thickness | One inch. |
| Overall diameter | 4 inches. |
| Root diameter 41 of spaces between cogs | 3.24 inches. |
| Total number of cogs on each roll | 24. |
| Circumferential length of each cog | About ¼ inch. |
| Space between each cog | About 3/16 inch. |
| Radius of all basilar surfaces 36 | 0.47 inch. |
| Center of radius of medial cog basilar surface (Fig. 6) | Lies on roll vertical center line and 2.21 inches from roll axis. |
| Center of radius of right inclined cog basilar surface (Fig. 5) | Lies on a vertical line 0.070 inch displaced to the right of roll vertical center line and 2.33 inches from roll axis. |
| Center of radius of left inclined cog basilar surface (Fig. 4) | Same as right inclined cog but displaced to the left of roll vertical center line. |

The 24 sequential mating positions of the respective cogs in said rolls occurring during one complete revolution thereof, each position forming a passage for the mandrel and the casing, are as follows:

| Mating Position | Cog of Roll 26A | Cog of Roll 26B | Cog of Roll 26C |
|---|---|---|---|
| 1 | Medial | Left inclined | Right inclined. |
| 2 | Right inclined | Medial | Left inclined. |
| 3 | Left inclined | Right inclined | Medial. |
| 4 | Medial | Left inclined | Right inclined. |
| 5 | Right inclined | Medial | Left inclined. |
| 6 | Left inclined | Right inclined | Medial. |
| 7 | Medial | Left inclined | Right inclined. |
| 8 | Right inclined | Medial | Left inclined. |
| 9 | Left inclined | Right inclined | Medial. |
| 10 | Medial | Left inclined | Right inclined. |
| 11 | Right inclined | Medial | Left inclined. |
| 12 | Left inclined | Right inclined | Medial. |
| 13 | Medial | Left inclined | Right inclined. |
| 14 | Right inclined | Medial | Left inclined. |
| 15 | Left inclined | Right inclined | Medial. |
| 16 | Medial | Left inclined | Right inclined. |
| 17 | Right inclined | Medial | Left inclined. |
| 18 | Left inclined | Right inclined | Medial. |
| 19 | Medial | Left inclined | Right inclined. |
| 20 | Right inclined | Medial | Left inclined. |
| 21 | Left inclined | Right inclined | Medial. |
| 22 | Medial | Left inclined | Right inclined. |
| 23 | Right inclined | Medial | Left inclined. |
| 24 | Left inclined | Right inclined | Medial. |

In the above described embodiment, the 24 cogs of each roll constitute eight repeating triad cog patterns. It is to be understood, however, that the total number of triad cog patterns on a shirring roll periphery can be less or more than 24. For example, a similar set of shirring rolls 26A, 26B, 26C of substantially the same diameter but containing each only six triad cog patterns in their periphery (18 cogs in all consisting of six medial cogs, six left inclined cogs, and six right inclined cogs) and with the spaces between the cogs being proportionately wider produced compressed shirred sticks averaging 8 inches in length, from 55 ft. lengths of 20/32" inflated diameter tubular cellulosic casing stock. The wider spacing of the cogs in this embodiment effecting greater circumaxial displacement of the casing and thus producing a shorter compressed shirred stick than the previously described embodiment employing 24 cogs in each roll's periphery.

Figure 13:
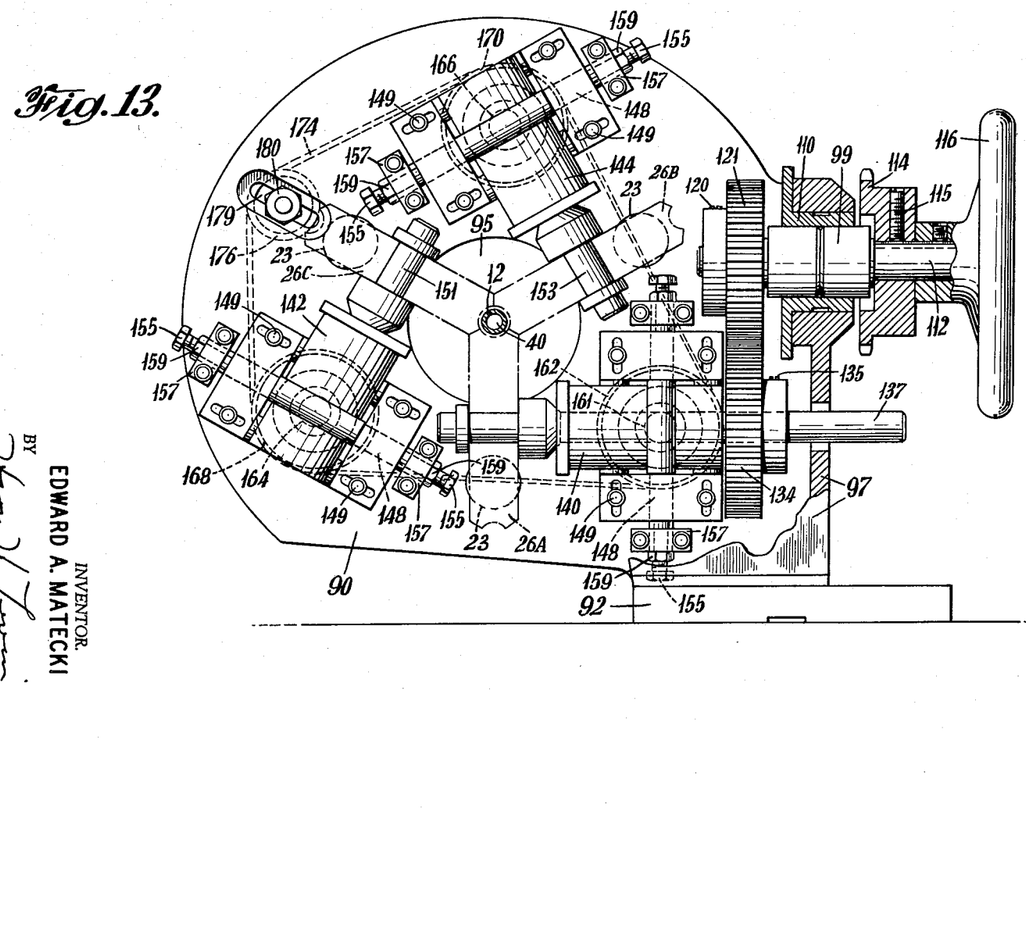
Fig. 13 is an enlarged elevational view, partly broken away, of a synchronized driving mechanism for the shirring roll apparatus of Figs. 1 to 9.
Figure 14:
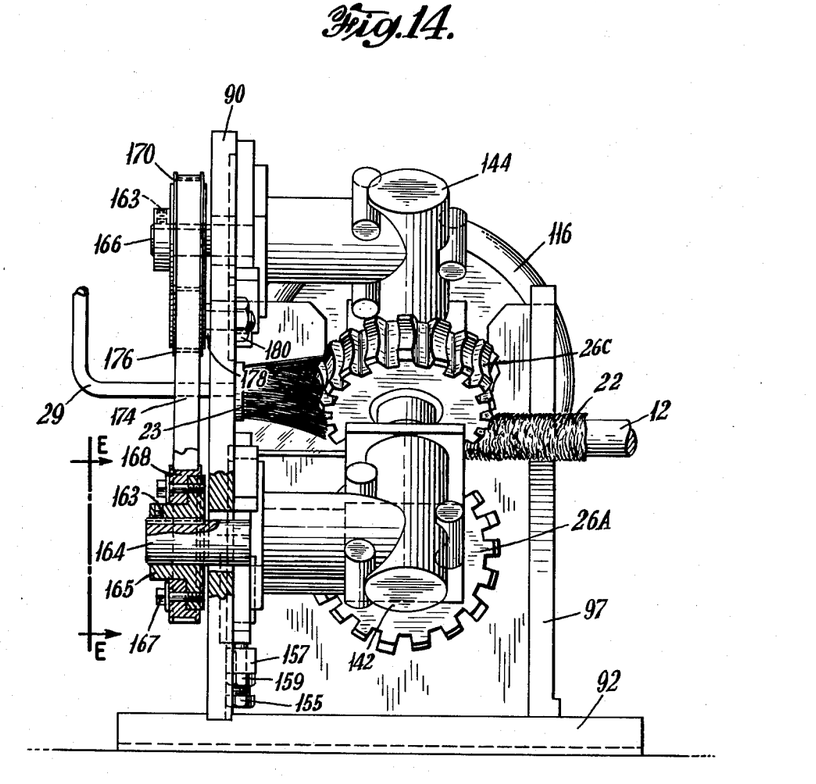
Fig. 14 is a side elevational view partly broken away, of the roll driving mechanism shown in Fig. 13.
Figure 14A:
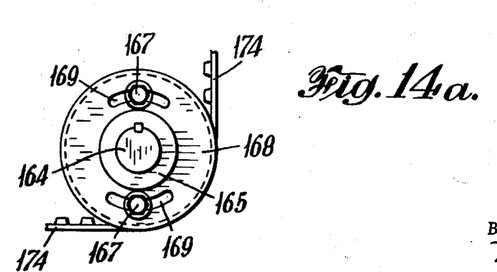
Fig. 14A is an end elevational view of an adjustable timing belt pulley taken substantially in the direction of arrows E—E of Fig. 14.

Means for radial adjustment and cog alignment of the three-roll shirring apparatus of Figs. 2 to 9 are shown in greater detail by Figs. 13, 14, and 14A. As shown, the rolls 26A, 26B, and 26C, basilar surface lubricating brushes 23 connected to oil supply line 29 and means for synchronously rotating each roll are mounted on a vertical plate member 90 secured to a base member 92. An opening 95 concentric with the mandrel 12 is provided in plate 90. A vertical bracket member 97 is fastened to the base 92 and forms a right angle with respect to plate member 90. An eccentric bushing 110 is suitably secured to bracket 97. A rotatable shaft 112 extends through and is supported by an anti-friction ball bearing assembly 99 which is press-fitted into the eccentric bushing 110. Rotation of bushing 110 eccentrically lowers or raises shaft 112. Near the outer end of shaft 112 is fastened a sprocket gear 114 by means of a set screw 115. A hand wheel 116 is fastened by a set screw on the shaft 112 adjacent to sprocket gear 114 and is employed for manual rotation of the several parts when threading the casing into and when adjusting the apparatus.

Sprocket gear 114 is driven by a sprocket chain (not shown) connected to an electric motor or other suitable driving means (not shown).

Fastened to the inner end of shaft 112 by means of a set screw 120 is a spur gear 121 which is meshed with a spur gear 134 fastened by means of set screw 135 to the outer end of a drive shaft 137, extending from a right angle enclosed miter gear box 140 hereinafter referred to as the master drive gear box. A suitable miter gear box is that sold as model R–320 by Airborne Accessories Corp., Hillside, New Jersey, but similar units by other manufacturers are equally satisfactory. Shirring roll 26A is keyed to the end of drive shaft 137 extending from the other side of gear box 140 and accordingly rotates at the same speed as spur gear 134.

Right angle master miter gear box 140 and similar slave driven miter gear boxes 142 and 144 are equiangularly spaced about the opening 95 in vertical plate 90 and are secured to the face of plate 90 by cap screws 149 extending through sloted openings in the base of each gear box. Upon cap screws 149 being loosened, each gear box can be shifted back and forth on keyway 148 formed in plate 90 in a direction perpendicular to the driveshafts 137, 151, 153 respectively of each gear box 140, 142, 144. Adjustment screws 155 threadably engaged with internally threaded bosses 157 which are integral with vertical plate 90, bear on each end of the gear boxes 140, 142, and 144 to accurately position said gear boxes. Lock nuts 159 on each adjustment screw are employed to lock said gear boxes in adjusted position.

A rotating shaft 161 extends from the base of master drive gear box 140 through an opening in vertical plate member 90 and it rotates at the same speed as driving shaft 137 upon which roll 26A is fastened. A cogged pulley (the cogged surfaces thereof not shown) 162 is secured by a set screw (not shown) to the end of shaft 161 projecting through plate member 90.

Slave gear boxes 142 and 144 respectively have rotating shafts 164 and 166 extending through openings in vertical plate 90 and have cogged pulleys (the cogged surfaces thereof not shown) 168 and 170 secured thereto. Pulleys 168 and 170 are identical to cogged pulley 162 of master gear box 140 whereby its cogged pulley 162 by means of cogged flexible belt 174 drives all pulleys at the same rotational speed. A non-slipping contact of cogged belt 174 with the surfaces of all the pulleys is maintained by idler pulley 176 rotating on a shaft 178 extending through a slotted opening 179 in vertical plate member 90 and locked in position by nut 180.

As further shown in Fig. 14a, each of said cogged pulleys 162, 168, and 170 are mounted on a flanged hub 165 by means of bolts 167 extending through slotted openings 169 in the pulleys and threaded into the flanges of hubs 165 whereby the pulleys can be rotated through a limited arc with respect to the keyed mounted position of hub 165 for purposes of alignment adjustment of rolls 26A, B, C. The hubs 165 are keyed to their respective shafts and further secured thereto by set screws 163.

Slave gear boxes 142 and 144 each have respectively a rotating output shaft 151, 153 to which is keyed or otherwise securely fastened shirring rolls 26C and 26B respectively. It is to be understood that each of said rolls 26A, 26B, and 26C all rotate at the same speed.

Figure 21:
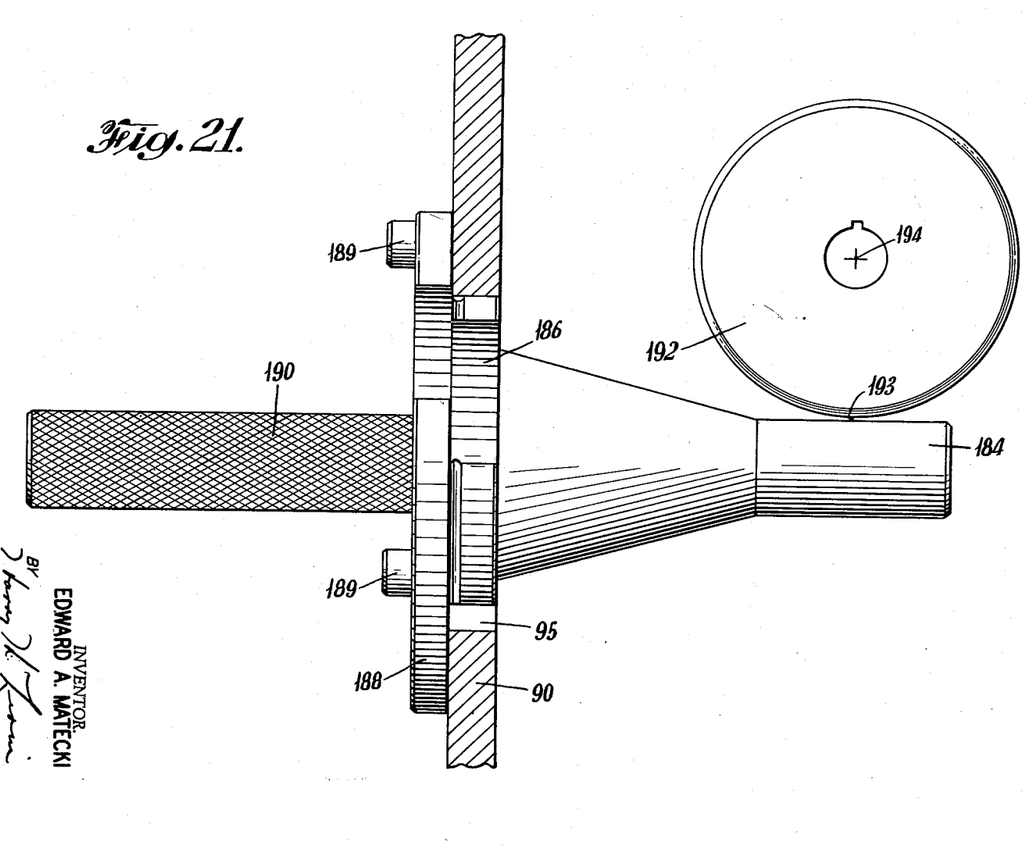
Fig. 21 is an elevational view of a plug gauge for checking the radial alignment of the shirring rolls with respect to the mandrel.

Precise peripheral alignment of shirring rolls 26A, 26B, and 26C with respect to mandrel 12 is obtained by employing a plug gauge as shown in Fig. 21. The plug gauge comprises a cylindrical projection 184 having a diameter twice the distance between basilar surface 36 and the centerline of mandrel 12. The cylindrical projection 184 tapers outwardly in extension to a cylindrical plate surface 186 having a diameter equivalent to machine fit with the opening 95 in vertical plate member 90.

A shoulder 188 on the gauge plug is provided with openings for temporarily holding the gauge against the rear side of plate member 90 by means of bolts 189. The gauge is provided with a handle 190 for convenience in use.

In initially setting up and aligning the shirring rolls of the apparatus, all the shirring rolls 26A, 26B, and 26C are removed from their respective shafts 137, 153, and 151, and a plain surfaced gauge wheel 192 having a diameter slightly less than (such as 0.020" less) twice the radial distance from the centerline 194 of roll 26 to basilar surface 36. By measuring the space 193 between projection 184 and gauge wheel 192 as with a leaf gauge, accurate location of roll centerline 194 is readily obtained. After each of the gear boxes 140, 142, and 144 has thereby been properly positioned with the aid of adustment screws 155, the gear boxes are securely fastened into position by tightening cap screws 149. After the adjustment has been made, the plain surfaced gauge wheel 192 is removed, and shirring rolls 26A, 26B, and 26C are keyed in place.

Mating of the cogs is produced by adjustment of the slotted drive pulleys as illustrated in Figs. 14 and 14A.

Figure 16:
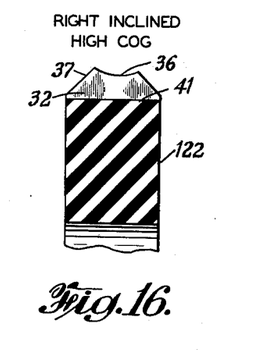
Fig. 16 is a partial sectional view of the roll shown in Fig. 15 and showing the profile of a right-inclined high cog.
Figure 17:
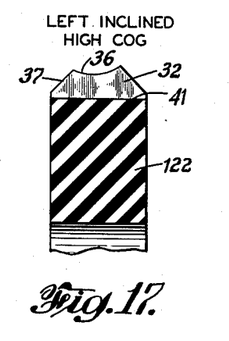
Fig. 17 is similar to Fig. 16 but shows the profile of a left-inclined high cog.
Figure 18:
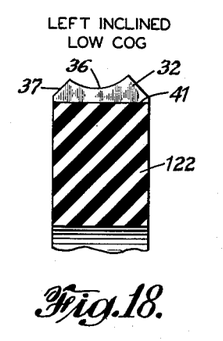
Fig. 18 is also similar to Fig. 16 but shows the profile of a left-inclined low cog.
Figure 19:
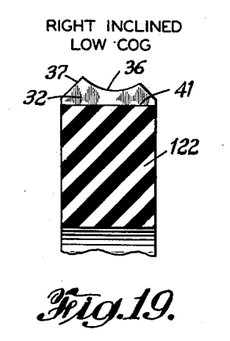
Fig. 19 is also similar to Fig. 16 but shows the profile of a right-inclined low cog.

As was previously stated, a four-roll shirring apparatus constitutes another embodiment of this invention. A shirring roll suitable for such apparatus is shown in Fig. 15, and it has a repeating tetrad sequence of different saddle shaped cogs around its periphery, consisting of a right-inclined high cog whose profile is shown in Fig. 16, followed by a left-inclined high cog whose profile is shown in Fig. 17, followed in turn by a left-inclined low cog whose profile is shown in Fig. 18, and it in turn by right-inclined low cog whose profile is shown in Fig. 19.

Figure 15:
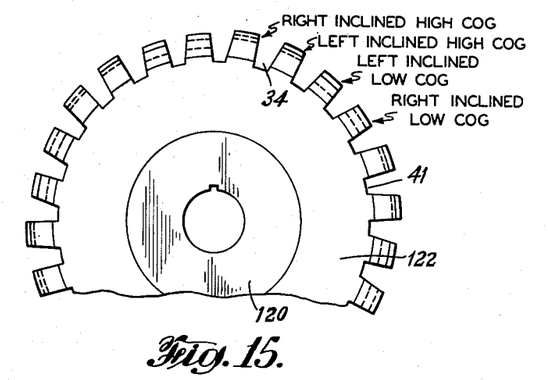
Fig. 15 is a partial side elevational view of a cogged shirring roll employed in an embodiment of a four-roll shirring apparatus.
Figure 20:
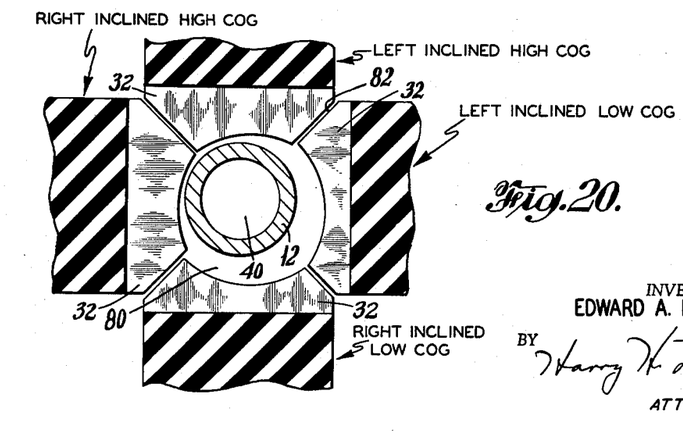
Fig. 20 is a sectional view taken generally along line D—D of Fig. 1 of a shirring apparatus embodiment having four opposed shirring rolls to form a central passage through which the shirring mandrel extends in place of the three shirring rolls shown in Fig. 1.

Four identical shirring rolls as illustrated in Fig. 15 and mounted as shown in Fig. 20 produced shirred casing having a helical pattern similar to that illustrated in Fig. 12. In the instance of shirring regenerated cellulose tubing of 20/32" inflated diameter, four rolls identical to Fig. 15 were employed, each having a diameter of 4 inches and each containing six repetitive tetrad sequences of the cogs whose profiles are illustrated in Figs. 16 to 19.

Fig. 20 depicts one of the four orbitally displaced passages 80 formed by the abutting cogs of the four rolls. The other three passages are sequentially formed as the rolls are synchronously rotated whereby a gyrating passage is formed and the casing helically folded similarly to that illustrated in Fig. 11 for the three-roll embodiment, but differing therefrom in that the helix is produced by four superimposed ovoid-shaped sections instead of the three sections in Fig. 11.

With the apparatus of Figs. 2–9, inclusive, occasions have arisen during the shirring operation when shirring has not proceeded as efficiently as desired on some sizes of casing because of flare-ups of the inflated casing adjacent the entrance of the shirring rolls. As indicated previously herein, this condition apparently is due to slippage of the shirring rolls on the inflated casing, but it has been corrected by increasing the circumferential length of one shirring cog of each triad group, as is illustrated in Figs. 22 and 23.

Figure 22:
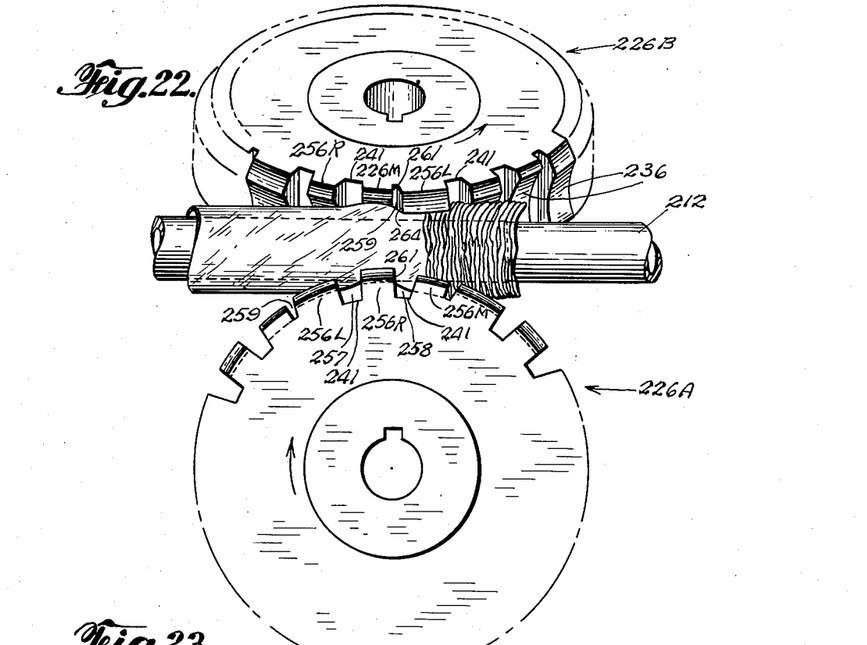
Fig. 22 is a view similar to Fig. 3 illustrating a modified form of shirring roll according to the invention.
Figure 23:
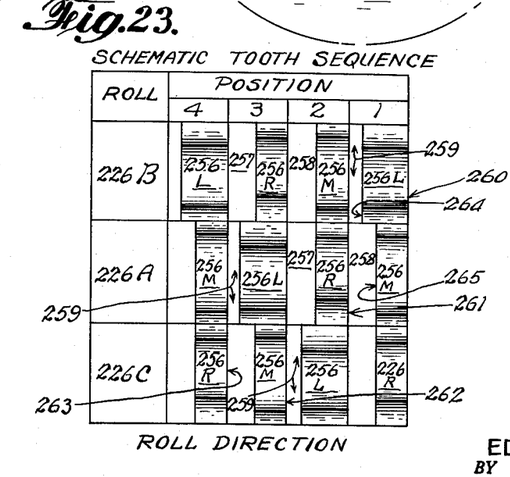
Fig. 23 is a table illustrating in developed form certain cogs of the shirring rolls of Fig. 22 in successive positions during the shirring operation.

Thus in Fig. 22 there is shown a pair of rolls 226A and 226B occupying the same positon as, and operating essentially similarly to, the rolls 26A and 26B of Fig. 3, and reference should be had thereto for an understanding of the operation of the rolls 226A and 226B. While not shown in Fig. 22, there is in the shirring apparatus, according to this figure, another roll 226C which is shown schematically in Fig. 23 and occupies the same relative position as roll 26C. Reference should also be had to Figs. 7, 8 and 9 since the functioning of rolls 226A, 226B and 226C follows the functioning of the rolls 26A, 26B and 26C there illustrated.

Reference characters on Fig. 22, for corresponding parts, will be those of Figs. 7, 8 and 9 with 200 added thereto for ease of understanding. The positions of rolls 226A and 226B as shown correspond to the positions of rolls 26A and 26B in Fig. 8 and position 2 of Fig. 23. Thus, the cog or tooth of roll 226A, immediately to the left of the center line connecting the centers of rolls 226A and 226B, is a right-inclined cog and is designated 256R. Similarly, the cog or tooth of roll 226B, immediately to the left of the same center line, is a medial cog and is designated 256M. The other cog of this group of cogs (not shown in Fig. 22 but shown schematically in Fig. 23) is, therefore, a left-inclined cog and is designated 256L. For position 1 of rolls 226A, 226B and 226C, that is, positions of the rolls when the cogs which are one cog ahead of those described for position 2 are lying on the roll center line, the cog on roll 226A is a medial cog designated 256M, the cog on roll 226B is a left-inclined cog designated 256L, and similarly the other cog of this group (not shown in Fig. 22 but shown schematically in Fig. 23) is a right-inclined cog and is designated 256R. Accordingly, this position of the rolls of Fig. 22 corresponds to the position of the rolls in Fig. 7 and to position 1 of Fig. 23. For position 3 of rolls 226A, 226B and 226C, that is, positions of the rolls when the cogs which are one cog behind these described for position 2 are lying on the roll center line, the cog on roll 226A is a left-inclined cog designated 256L, the cog on roll 226B is a right-inclined cog designated 256R and the remaining cog of this group (not shown in Fig. 22 but shown schematically in Fig. 23) is a medial cog designated 256M. Accordingly, this position of the rolls of Fig. 22 corresponds to the position of the rolls in Fig. 9 and to position 3 of Fig. 23.

The shirring rolls 226A, 226B and 226C are identical to each other and each roll comprises repetitive triad groups of cogs or teeth 256M, 256R and 256L. For each shirring position a medial cog of one roll, a right-inclined cog of the second roll and a left-inclined cog of the third roll come together for displacing the inflated casing as already described.

For a better understanding of the nature of rolls 226A, 226B and 226C and of Fig. 23, the manner of arranging Fig. 23 may be explained. Referring to Fig. 22 and viewing the rolls from the right end of the mandrel, assume that roll 226B is pivoted clockwise until it lies alongside roll 226A and assume that roll 226C (not shown but refer to roll 26C, Fig. 9, for analogy) is pivoted counterclockwise until it lies alongside roll 226A. Assume also that in these final positions the views of the cogs are taken as though the cogs were lying in a single plane. Then the rolls will lie alongside each other (as shown diagrammatically in Fig. 23). Positions 1, 2 and 3 of Fig. 23 represent a complete cycle of shirring cogs on all rolls and position 4 represents the beginning of another cycle and thus corresponds to position 1. While not shown in Fig. 23, the next succeeding position would be like position 2, and so on.

The scale of Figs. 22 and 23 is substantially the same and is also substantially the same as that of Fig. 3. Thus, except for the fact that each roll of Figs. 22 and 23 has twenty-one teeth and is designed for size 24 casing, and each roll of Fig. 3 has twenty-four teeth and is designed for size 26 casing, the form of rolls 226A, 226B and 226C differs from the form of rolls 26A, 26B and 26C only in that the left-inclined cogs 256L are longer circumferentially than right-inclined cogs 256R and medial cogs 256M and all cogs of rolls 26A, 26B and 26C are of the same length circumferentially.

Referring to Figs. 22 and 23, it will be seen that cogs 256R and 256M are of the same length circumferentially and the slots 257 and 258 behind and ahead of each right-inclined tooth are of the same dimensions. The slot 259 between the left-inclined cogs 256L and the medial cogs 256M is shorter than slots 257 and 258 by the amount of the increase in length of left-inclined cogs 256L over the length of the right-inclined and medial cogs 256R and 256M, respectively. The depth of slot 259 is shown not as great as that of slots 257 and 258 and it may be any depth up to that of slots 257 and 259 so long as it is sufficiently deep to enable the cutting tool forming slot 259 to provide a clean cut leading edge at the basilar surface of medial cogs 256M.

The leading edges of cogs 256M, 256L and 256R on each roll are equally spaced from each other around the roll periphery. The leading edges of a medial cog on one roll, a right-inclined cog on another roll and a left-inclined cog of the third roll, shown as lines 260, 261, 262 and 263 for respective roll positions 1, 2, 3 and 4 in Fig. 23, come in together and the cogs together form a passage for orbitally displacing the casing as has already been described in connection with other figures, but the trailing edge 264 of left-inclined cog 256L is behind the trailing edge 265 of the medial cog and right-inclined cog 256M and 256R, respectively.

The trailing edge 264 of the left-inclined cog 256L, in position 1 of Fig. 23 and as shown in Fig. 22, and the combined leading edges 261 of the medial and right-inclined cogs 256M and 256R in position 2 of Fig. 23 and as shown in the center line position of Fig. 22 provide a binding effect on the inflated casing as it is being shirred and thus transport the casing without slipping. This occurs because the distance from the trailing edge 264 of the left-inclined cog 256L to the combined leading edge 261 of cogs 256R and 256L is less than it would be if the left-inclined cog 256L were shorter circumferentially than it is, as may be observed in Figs. 22 and 23. As may be seen in Figs. 7, 8 and 9, the left- and right-inclined cogs come closer to the mandrel than do the medial cogs.

For each roll tooth position, as shown in Fig. 23, a corresponding decrease exists in distance between the trailing edge of the left-inclined cog in that roll tooth position and the combined leading edge of the right-inclined and left-inclined cogs of the next succeeding roll position. There is, therefore, a casing binding or gripping effect produced at each cog position of the rolls, and consequently a continuous movement of the casing. The additional length of the left-inclined cogs 256L provides a somewhat larger frictional area of the rolls relative to the casing, but this effect is believed to be secondary, the binding effect being believed to be the principal casing moving effect. The circumferential length of the left-inclined cogs may be of any amount to achieve the necessary gripping so long as the slot 259 remains, the latter being necessary to the spiral pleat pattern.

It has been found that in the cog shirring sequence as shown in Figs. 7, 8 and 9 which produces a left spiral pleat pattern, as shown in Fig. 11, the left-inclined cog must be lengthened circumferentially. Lengthening of the medial cog has no effect and lengthening of the right-inclined cog does not provide as much casing gripping as may be desired to remedy the condition existing and, in addition, alters the shirring pleat pattern. If the cog shirring sequence were counter to that shown in Figs. 7, 8 and 9, which would produce a spiral pleat pattern counter to that of Fig. 11, the right-inclined cogs would have to be lengthened circumferentially.

For shirring casing of 24/32" inflated diameter with rolls as illustrated in Figs. 22 and 23, the following specifications of the roll and mandrel of an actual constructed apparatus apply:

| | |
|---|---|
| Mandrel outside diameter | .590 inch. |
| Roll thickness | One inch. |
| Over-all diameter | About 4 inches. |
| Root diameter 241 of spaces 257 and 258 on respective sides of right-inclined cogs | 3.28 inches. |
| Total number of cogs on each roll | 21. |
| Circumferential length of right-inclined cogs 256R and medial cogs 256M | .321 inch. |
| Circumferential length of left-inclined cogs 256L | .470 inch. |
| Radius of all basilar surfaces (i.e., 236) | .468 inch. |
| Center of radius of medial cog (256M) basilar surface (Fig. 6) | Lies on roll vertical center line and 2.251 inches from roll axis. |
| Center of radius of right-inclined cog (256R) basilar surfaces (Fig. 5) | Lies on a vertical line 0.062 inch displaced to the right of roll vertical center line and 2.340 inches from roll axis. |
| Center of radius of left-inclined cog (256L) basilar surface (Fig. 4) | Same as right-inclined cogs but displaced to the left of roll vertical center line. |

For rolls of the form shown in Figs. 22 and 23 to be used in shirring size 26/32" inflated casing, as in Fig. 3, the following specifications of actually constructed apparatus apply:

| | |
|---|---|
| Total number of cogs | 21. |
| Circumferential length of right-inclined cogs 256R and medial cogs 256M | .321 inch. |
| Circumferential length of left-inclined cogs 256L | .470 inch. |
| Radius of all basilar surfaces | .500 inch. |
| Center of radius of medial cog 256M basilar surface (Fig. 6) | Lies on roll vertical center line and 2.247 inches from roll axis. |
| Center of radius of right-inclined cog 256R basilar surface (Fig. 5) | Lies on a vertical line .069 inch displaced to the right of roll vertical center line and 2.357 inches from roll axis. |
| Center of radius of left-inclined cog 256L basilar surface (Fig. 4) | Same as right-inclined cogs but displaced to left of roll vertical center line. |

The other dimensions for a roll of this character are the same as set forth previously herein.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. In an apparatus for shirring tubular cellulosic casing, a mandrel along which an inflated casing is fed, a plurality of identical cog-surfaced shirring rolls rotating at the same peripheral speed and positioned to provide a passage through which the mandrel extends and the inflated casing passes, said passage being smaller than the diameter of the inflated casing to circumferentially indent and feed the casing over the mandrel, said rolls being arranged with the respective center axis thereof equidistantly spaced from the mandrel axis, each of said rolls having in its periphery spaced cogs with an arcuate basilar surface for supporting and indenting a section of the casing, said rolls being positioned with the cog of one roll mating with a cog of each other roll to form said passage.

2. In an apparatus for shirring tubular cellulosic casing, a mandrel along which an inflated casing is fed, a plurality of identical cog-surfaced shirring rolls rotating at the same peripheral speed and positioned to provide a substantially circular passage through which the mandrel extends and the casing passes, said passage being of smaller dimensions than the inflated casing to circumferentially indent and feed the casing over the mandrel, said rolls being arranged with the respective center axis thereof equidistantly spaced from the mandrel axis, each of said rolls having in its periphery equally spaced cogs with an arcuate basilar surface for supporting and indenting a section of the casing, said rolls being positioned with the cag of one roll mating with a cog of each other roll at said passage, and with the arcuate basilar surface of said mating cogs forming substantially said passage eccentric to the mandrel, and means for lubricating said basilar surfaces and said mandrel.

3. In an apparatus for shirring tubular cellulosic casing, a mandrel along which an inflated casing is fed, three identical cog-surfaced shirring rolls rotating at the same peripheral speed and positioned to provide a passage through which the mandrel extends and the inflated casing passes, said passage being of smaller dimensions than the inflated casing to indent and feed the casing over the mandrel, said rolls being arranged with the respective center axis thereof equidistantly spaced from the mandrel axis, each of said rolls having on its periphery equally spaced cogs with an arcuate basilar surface for supporting and indenting a section of the casing, the cog of one roll mating with a cog of each other roll at said passage and with the basilar surfaces of the mating cogs forming a substantially ovate passage eccentric to the mandrel and with the succeeding cogs of each roll mating to form by their basilar surfaces an eccentric gyrating passage, and means for lubricating said basilar surfaces and said mandrel.

4. In an apparatus for shirring tubular cellulosic casing, a mandrel along which an inflated casing is fed, four identical cog-surfaced shirring rolls rotating at the same peripheral speed and positioned to provide a passage through which the mandrel extends and the inflated casing passes, said passage being of smaller diameter than the inflated casing to indent and feed the casing over the mandrel, said rolls being arranged with the respective center axis thereof equidistantly spaced from the mandrel axis, each of said rolls having on its periphery equally spaced cogs with an arcuate basilar surface for supporting and indenting a section of casing, each cog of one roll mating with a cog in each of the other rolls, the configurations of the arcuate basilar surfaces of the mating cogs combining to form said passage eccentric to the mandrel, and with the configuration of the basilar surfaces on succeeding mating cogs forming a passage repetitively gyrating around the mandrel.

5. In a tube shirring apparatus as set forth in claim 1 wherein the radius of concavity of the arcuate basilar surfaces is at least equal to half the greatest dimension of the passage formed by the mating cogs.

6. In a tube shirring apparatus as set forth in claim 3 wherein the cogs of the shirring rolls have a repetitive tried sequence of basilar surfaces for forming a gyrating passage.

7. In a tube shirring apparatus as set forth in claim 4 wherein the cogs of the shirring rolls have a repetitive tetrad sequence of basilar surfaces for forming a gyrating passage.

8. In an apparatus for shirring tubular cellulosic casing, a mandrel along which an inflated casing is fed, a plurality of identical cog-surfaced shirring rolls rotating at the same peripheral speed and positioned to provide a passage through which the mandrel extends and the inflated casing passes, said passage being smaller than the diameter of the inflated casing to circumferentially indent and feed the casing over the mandrel, said rolls being arranged with the respective center axis thereof equidistantly spaced from the mandrel axis, each of said rolls having cogs in its periphery and each cog having an arcuate basilar surface for supporting and indenting a section of the casing, the leading edges of said cogs being equally spaced, said rolls being positioned with the leading edge of the cog of one roll mating with the leading edge of a cog of each other roll to form said passage, certain cogs on each of said rolls including means for increasing the gripping force of the cogs on the inflated casing.

9. In an apparatus for shirring tubular cellulosic casing, a mandrel along which an inflated casing is fed, three identical cog-surfaced shirring rolls rotating at the same peripheral speed and positioned to provide a passage through which the mandrel extends and the inflated casing passes, said passage being of smaller dimensions than the inflated casing to indent and feed the casing over the mandrel, said rolls being arranged with respective center axis thereof equidistantly spaced from the mandrel axis, each of said rolls having cogs on its periphery and each of said cogs having an arcuate basilar surface for supporting and indenting a section of the casing, the leading edges of said cogs being equally spaced, the leading edge of the cog of one roll mating with the leading edge of a cog of each other roll at said passage and with the basilar surfaces of the mating cogs forming a substantially ovate passage eccentric to the mandrel and with the succeeding cogs of each roll mating at their leading edges to form by their basilar surfaces an eccentric gyrating passage, certain cogs on each of said rolls including means for increasing the gripping force of the cogs on the inflated casing, and means for lubricating said basilar surfaces and said mandrel.

10. In an apparatus for shirring tubular cellulosic casing, a mandrel along which an inflated casing is fed, three identical cog-surfaced shirring rolls rotating at the same peripheral speed and positioned to provide a passage through which the mandrel extends and the inflated casing passes, said passage being of smaller dimensions than the inflated casing to indent and feed the casing over the mandrel, said rolls being arranged with respective center axis thereof equidistantly spaced from the mandrel axis, each of said rolls having on its periphery identical repetitive groups of cogs of which each cog has an arcuate basilar surface for supporting and indenting a section of casing, the basilar surfaces of the cogs of each repetitive group being successively and progressively arcuately formed and disposed, the leading edges of said cogs being equally spaced, the leading edge of one cog of one repetitive group of one roll mating with the leading edge of the next successive cog of one repetitive group of the second roll and mating with the leading edge of the further successive cog of one repetitive group of the third roll at said passage whereby the basilar surfaces of the mating cogs form a substantially ovate section eccentric to the mandrel, succeeding cogs of each repetitive group of each roll similarly mating at their leading edges to form by their basilar surfaces an eccentric gyrating passage about said mandrel, one cog of each repetitive group on each roll whose trailing edge forms a casing gripping means with the leading edges of certain succeeding cogs of the other rolls having a greater circumferential length than the remaining cogs of said repetitive group, and means for lubricating said basilar surfaces and said mandrel.

11. In an apparatus for shirring tubular cellulosic casing, a mandrel along which an inflated casing is fed, three identical cog-surfaced shirring rolls rotating at the same peripheral speed and positioned to provide a passage through which the mandrel extends and the inflated casing passes, said passage being of smaller dimensions than the inflated casing to indent and feed the casing over the mandrel, said rolls being arranged with respective center axis thereof equidistantly spaced from the mandrel axis, each of said rolls having on its periphery identical repetitive groups of cogs of which each cog has an arcuate basilar surface for supporting and indenting a section of casing, the basilar surfaces of the cogs of each repetitive group being successively and progressively arcuately formed and disposed, the leading edges of said cogs being equally spaced, the leading edge of one cog of one repetitive group of one roll mating with the leading edge of the next successive cog of one repetitive group of the second roll and mating with the leading edge of the further successive cog of one repetitive group of the third roll at said passage whereby the basilar surfaces of the mating cogs form a substantially ovate section eccentric to the mandrel, succeeding cogs of each repetitive group of each roll similarly mating at their leading edges to form by their basilar surfaces an eccentric gyrating passage about said mandrel, one of the cogs of each repetitive group whose basilar surface forms that part of said eccentric passage nearest to the mandrel having a greater circumferential length than the remaining cogs of said repetitive group, and means for lubricating said basilar surfaces and said mandrel.

12. In an apparatus for shirring tubular cellulosic casing, a mandrel along which an inflated casing is fed, three identical cog-surfaced shirring rolls rotating at the same peripheral speed and positioned to provide a passage through which the mandrel extends and the inflated casing passes, said passage being of smaller dimensions than the inflated casing to indent and feed the casing over the mandrel, said rolls being arranged with respective center axis thereof equidistantly spaced from the mandrel axis, each of said rolls having on its periphery identical repetitive groups of cogs of which each cog has an arcuate basilar surface for supporting and indenting a section of casing, the basilar surfaces of the cogs of each repetitive group being successively and progressively arcuately formed and disposed, the leading edges of said cogs being equally spaced, the leading edge of one cog of one repetitive group of one roll mating with the leading edge of the next successive cog of one repetitive group of the second roll and mating with the leading edge of the further successive cog of one repetitive group of the third roll at said passage whereby the basilar surfaces of the mating cogs form a substantially ovate section eccentric to the mandrel, succeeding cogs of each repetitive group of each roll similarly mating at their leading edges to form by their basilar surfaces an eccentric gyrating passage about said mandrel, said gyrating passage forming a spiral pleat pattern of a certain direction in said inflated casing, one of the cogs of each repetitive group, whose basilar surface forms that part of said eccentric passage nearest to the mandrel and is directionally related to said spiral direction, having a greater circumferential length than the remaining cogs of said repetitive group, and means for lubricating said basilar surfaces and said mandrel.

13. In an apparatus for shirring tubular cellulosic casing, a mandrel along which an inflated casing is fed, three identical cog-surfaced shirring rolls rotating at the same peripheral speed and positioned to provide a passage through which the mandrel extends and the inflated casing passes, said passage being of smaller dimensions than the inflated casing to indent and feed the casing over the mandrel, said rolls being arranged with respective center axis thereof equidistantly spaced from the mandrel axis, each of said rolls having on its periphery identical repetitive triad groups of cogs of which each cog has an arcuate basilar surface for supporting and indenting a section of casing, the basilar surfaces of the cogs of each repetitive group being successively and progressively arcuately formed and disposed as right-inclined, left-inclined and medial surfaces, the leading edges of said cogs being equally spaced, the leading edge of one cog of one repetitive group of one roll mating with the leading edge of the next successive cog of one repetitive group of the second roll and mating with the leading edge of the further successive cog of one repetitive group of the third roll at said passage whereby the right-inclined, left-inclined and medial basilar surfaces of the mating cogs form a substantially ovate section eccentric to the mandrel, succeeding cogs of each repetitive group of each roll similarly mating at their leading edges to form by their basilar surfaces an eccentric gyrating passage about said mandrel, said gyrating passage as determined by the direction of roll rotation forming a left spiral pleat pattern in said inflated casing, the left-inclined cog of each repetitive group having a greater circumferential length than the right-inclined and medial cogs of each repetitive group, and means for lubricating said basilar surfaces and said mandrel.

14. In an apparatus for shirring tubular cellulosic casing, a mandrel along which an inflated casing is fed, a plurality of identical cog-surfaced shirring rolls rotating at the same peripheral speed and positioned to provide a passage through which the mandrel extends and the inflated casing passes, said passage being smaller than the diameter of the inflated casing to circumferentially indent and feed the casing over the mandrel, said rolls being arranged with the respective center axis thereof equidistantly spaced from the mandrel axis, each of said rolls having cogs in its periphery and each cog having an arcuate basilar surface for supporting and indenting a section of the casing, the leading edges of said cogs being equally spaced, said rolls being positioned with the leading edge of the cog of one roll mating with the leading edge of a cog of each other roll to form said passage.

15. In an apparatus for shirring tubular cellulosic casing, a mandrel along which in inflated casing is fed, a plurality of identical cog-surfaced shirring rolls rotating at the same peripheral speed and positioned to provide a passage through which the mandrel extends and the inflated casing passes, said passage being smaller than the diameter of the inflated casing to circumfentially indent and feed the casing over the mandrel, said rolls being arranged with the respective center axis thereof equidistantly spaced from the mandrel axis, each of said rolls having cogs in its periphery and each cog having an arcuate basilar surface for supporting and indenting a section of the casing, the leading edges of said cogs being equally spaced, said rolls being positioned with the leading edge of the cog of one roll mating with the leading edge of a cog of each other roll to form said passage and with the arcuate basilar surfaces of said mating cogs forming substantially said passage eccentric to the mandrel, and means for lubricating said basilar surfaces and said mandrel.

References Cited in the file of this patent
UNITED STATES PATENTS

| | | |
|---|---|---|
| 1,059,411 | Unversaw et al. | Apr. 22, 1913 |
| 1,302,194 | Mayer | Apr. 29, 1919 |
| 1,761,189 | Brennan et al. | June 3, 1930 |
| 2,819,488 | Gimbel | Jan. 14, 1958 |

UNITED STATES PATENT OFFICE
CERTIFICATE OF CORRECTION

Patent No. 2,983,949                                May 16, 1961

Edward A. Matecki

It is hereby certified that error appears in the above numbered patent requiring correction and that the said Letters Patent should read as corrected below.

Column 14, line 33, for "cag" read -- cog --; column 15, line 7, for "tried" read -- triad --.

Signed and sealed this 23rd day of October 1962.

(SEAL)
Attest:

ERNEST W. SWIDER
Attesting Officer

DAVID L. LADD
Commissioner of Patents